(12) United States Patent
Wang et al.

(10) Patent No.: US 9,116,888 B1
(45) Date of Patent: Aug. 25, 2015

(54) CUSTOMER CONTROLLED DATA PRIVACY PROTECTION IN PUBLIC CLOUD

(71) Applicant: EMC Corporation, Hopkinton, MA (US)

(72) Inventors: Bin Wang, Beijing (CN); Lei Feng, Beijing (CN); Yandong Yao, Beijing (CN); Xiaoming Gao, Beijing (CN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/631,014

(22) Filed: Sep. 28, 2012

(51) Int. Cl.
*H04L 29/06* (2006.01)
*H04L 9/00* (2006.01)
*G06F 17/30* (2006.01)

(52) U.S. Cl.
CPC ..................................... *G06F 17/30* (2013.01)

(58) Field of Classification Search
CPC .......... G06F 21/10; G06F 21/42; G06F 21/51
USPC ................... 713/150, 153, 154, 155; 380/277
See application file for complete search history.

(56) References Cited

U.S. PATENT DOCUMENTS

| | | | | |
|---|---|---|---|---|
| 5,892,900 | A * | 4/1999 | Ginter et al. | 726/26 |
| 7,630,402 | B2 * | 12/2009 | Un et al. | 370/469 |
| 8,245,037 | B1 * | 8/2012 | Durgin et al. | 713/167 |
| 8,295,490 | B1 * | 10/2012 | McCoy et al. | 380/279 |
| 8,612,353 | B2 * | 12/2013 | Trimper et al. | 705/51 |
| 2004/0015723 | A1 * | 1/2004 | Pham et al. | 713/201 |
| 2005/0108657 | A1 * | 5/2005 | Han | 715/827 |
| 2007/0039050 | A1 * | 2/2007 | Aksenov et al. | 726/22 |
| 2007/0055879 | A1 * | 3/2007 | Luo et al. | 713/171 |
| 2007/0160082 | A1 * | 7/2007 | Un et al. | 370/469 |
| 2009/0327695 | A1 * | 12/2009 | Molsberry et al. | 713/151 |
| 2010/0257351 | A1 * | 10/2010 | O'Connor et al. | 713/150 |
| 2011/0055574 | A1 * | 3/2011 | Fascenda | 713/172 |
| 2011/0126012 | A1 * | 5/2011 | Ben-Ami et al. | 713/168 |
| 2011/0173438 | A1 * | 7/2011 | Matzkel | 713/150 |
| 2012/0005730 | A1 * | 1/2012 | Smith et al. | 726/5 |
| 2012/0070002 | A1 * | 3/2012 | Smith | 380/277 |
| 2012/0100803 | A1 * | 4/2012 | Suumaki et al. | 455/41.1 |
| 2012/0137347 | A1 | 5/2012 | Zhang et al. | |
| 2012/0269340 | A1 * | 10/2012 | Stu et al. | 380/28 |
| 2012/0284536 | A1 * | 11/2012 | Peterson | 713/193 |
| 2014/0019753 | A1 * | 1/2014 | Lowry et al. | 713/155 |
| 2014/0033200 | A1 * | 1/2014 | Tompkins | 718/1 |

FOREIGN PATENT DOCUMENTS

| | | |
|---|---|---|
| EP | 1947593 | 6/2010 |
| WO | 2006072610 | 7/2006 |

OTHER PUBLICATIONS

Client-Side Data Encryption with the AWS SDK for Java and Amazon S3, Amazon Web Services, Apr. 5, 2011.
Salesforce.com Tools That Support Privacy Compliance, Salesforce.com, inc., 2012.

* cited by examiner

*Primary Examiner* — Abu Sholeman
(74) *Attorney, Agent, or Firm* — Van Pelt, Yi & James LLP (57) ABSTRACT

Data to be submitted to a remote node is selectively protected. In various embodiments, an indication is received to protect a data value that is to be submitted, using a browser, to a remote node. A security key that is associated with the remote node is determined automatically. The data value is selectively encrypted using the security key. The encrypted data value is provided to the browser to be submitted to the remote node.

21 Claims, 11 Drawing Sheets

Accounting in Cloud http://accounting.cloud.com

Setup your company account:

Company Profile

Name: The one

Contact: 111-222-012

Annual Income: XXXXX

Employees: XXXXX

Account Information

Bank ID: 1244475

Account Number: XXXXX

Contact: 112-987-223

Submit

CUSTOMER CONTROLLED DATA PRIVACY PROTECTION IN PUBLIC CLOUD

BACKGROUND OF THE INVENTION

The growing use of cloud applications and services, by enterprise users and others, has resulted in sensitive data being stored in the cloud. As a result, data may be exposed to unauthorized access, e.g., by a malicious user who hacks into a cloud storage or other service or as a result of unintended "leakage" of data, such as from one cloud application, service, or user, to another one not intended or authorized to receive the data.

Existing mechanisms to protect data are limited typically to allowing application developers to implement a degree of protection over data determined by the developer as requiring protection, in a manner determined by the developer, and/or are limited to providing protection only to a subset of data or data types, e.g., only custom data fields.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to provide user-controlled data privacy protection for data stored in a public cloud are disclosed. In various embodiments, a user is provided with the ability to designate which fields, for example in a form or other display page associated with a cloud application or service, should be protected, e.g., by encryption. Data values entered into fields identified by the user is encrypted prior to being sent to the cloud server. In some embodiments, a browser plug in implements one or more techniques disclosed herein. In some embodiments, the user specifies the manner of encryption. In some embodiments, an appliance is provided and connected to the user's client system. The appliance generates, stores, and manages access to keys, and as information becomes available keeps track of which key(s) are associated with which cloud application URL's and/or for each URL, form, etc., which fields have been designated by the user to be protected, as disclosed herein.

Figure 1:
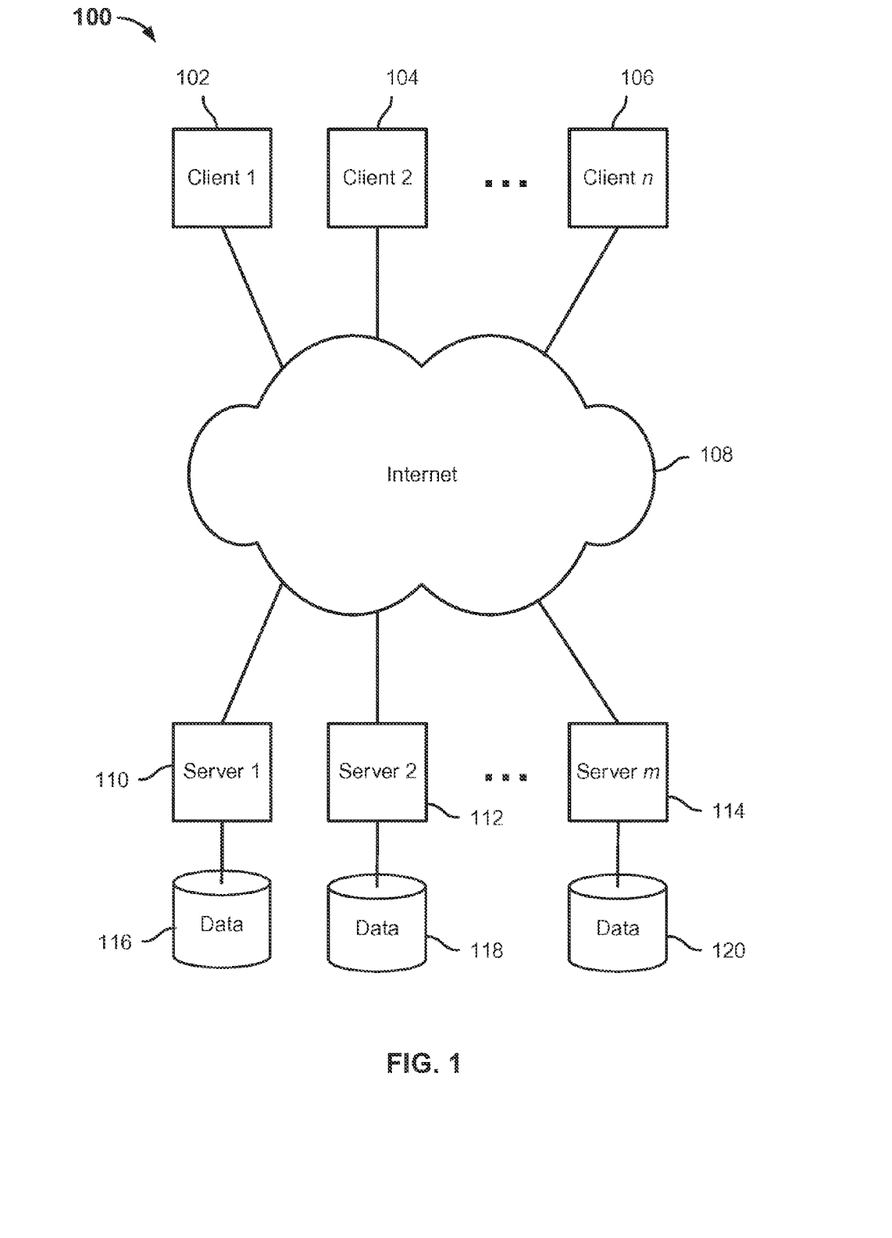
FIG. 1 is a block diagram illustrating an embodiment of a cloud computing environment.

FIG. 1 is a block diagram illustrating an embodiment of a cloud computing environment. In the example shown, the cloud computing environment 100 includes a plurality of client devices, represented in FIG. 1 by client devices 102, 104, and 106, connected via a network 108 with a plurality of application servers, represented in FIG. 1 by servers 110, 112, and 114, configured to provide to users of client devices such as 102, 104, and 106 access to cloud applications and/or services. The application servers are configured to receive from users of client devices such as 102, 104, and 106 proprietary, confidential, or otherwise sensitive data, including in many cases enterprise data, and to store such data in associated data stores such as 116, 118, and 120. Since many different users associated with different organizations commonly use the same cloud applications and services, each of the data stores such as 116, 118, and 120 typically have stored thereon data from many different users and organizations. Also, there may be a multi-tenant enabled technology in the cloud which lets users from different organizations share same application server and data store. While measures, such as user account and password requirements, typically are put in place to protect the confidentiality of data, the lack of physical control over the data stores by any one individual or organizational user of the cloud application or service, and the commingling of data from many users and organizations, gives rise to a risk of intentional or inadvertent access to sensitive data by an unauthorized user.

Typically it is not practical or desirable to encrypt all data submitted to a cloud application or service, and typical prior art services do not provide the end user the ability to specify which data should be protected, e.g., by encryption, and how (e.g., manner or type of encryption). Therefore, end user ("customer")-controlled selective protection of data submitted to cloud applications or services is disclosed. In various embodiments, a web page based, wizard, or other interface is provided to enable a user to specify which fields of a form or other input page should be protected, such as by encryption, and in some embodiments a manner of encryption to be used.

Figure 2:
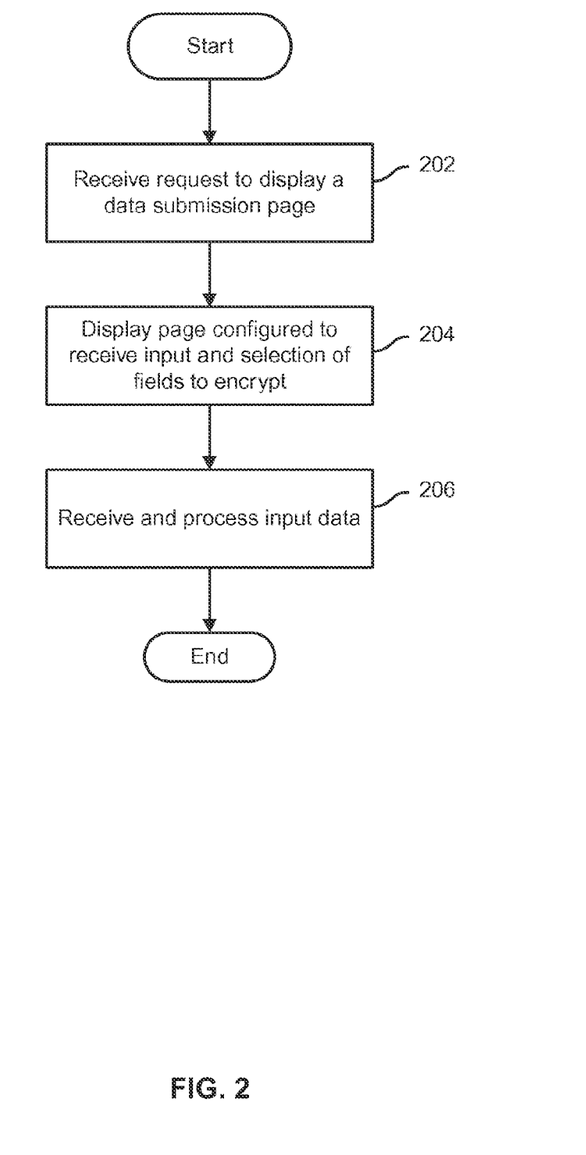
FIG. 2 is a flow chart illustrating an embodiment of a process to provide data protection in a cloud computing environment.

FIG. 2 is a flow chart illustrating an embodiment of a process to provide data protection in a cloud computing environment. In the example shown, a request to display a page associated with a cloud application or service, which page requires customer data to be supplied, is received (202). For example, the user enters into a browser a URL associated with a cloud application and corresponding to a display page that includes a form to solicit customer data. A display page configured to receive customer data as input, and to enable the user to specify fields to be protected, is displayed (204). In various embodiments, a browser plug in or other client side code detects that a retrieve page comprises a form with one or more input fields, for example. A display page and interface, modified by the plug in or other client side code, as described herein, is display (204). User input is received and processed (206). Examples include, without limitation, user input specify which fields are to be protected, user input indicating a method of encryption to be used, and user input in the form of data that may or may not be designated by the user to be protected.

Figure 3:
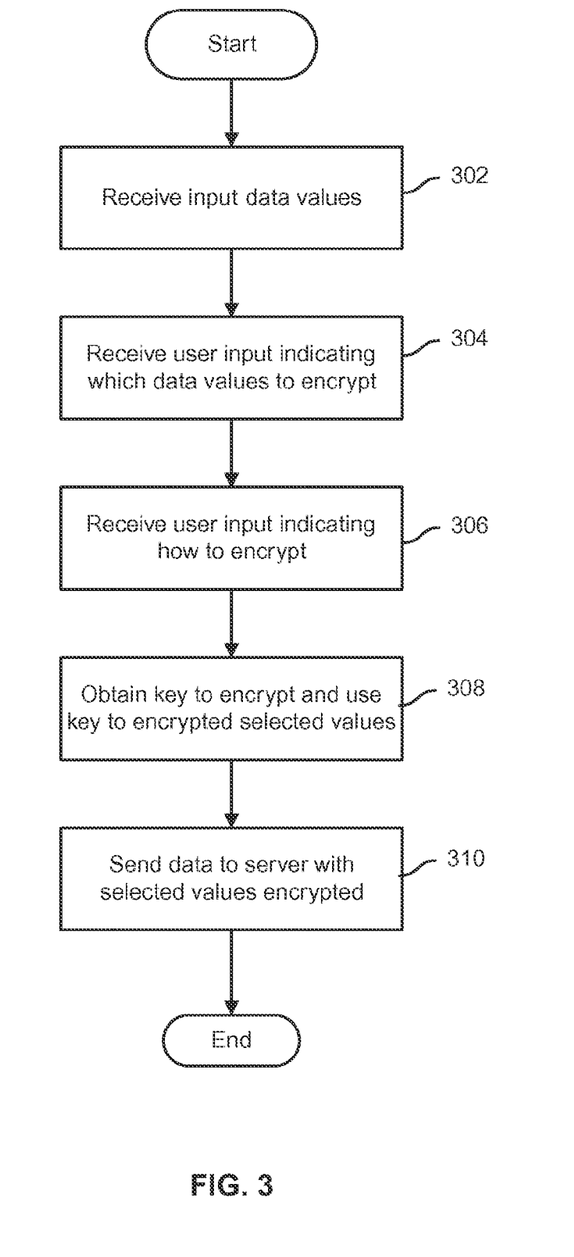
FIG. 3 is a flow chart illustrating an embodiment of a process to provide data protection in a cloud computing environment.

FIG. 3 is a flow chart illustrating an embodiment of a process to provide data protection in a cloud computing environment. In some embodiments, step 206 of FIG. 2 includes the process of FIG. 3. In the example shown, input data values are received (302), e.g., data input by the user into one or more form fields. User input indicating which data is to be protected is received (304), e.g., via checkboxes or some other control or interface. User input indicating a method of encryption to be used is received (306). Examples of policy (methods) of encryption that may be made available for the user to specify include, without limitation, one or more of tenant based key (shared by n users associated with the same cloud application or service organizational customer, i.e., "tenant"); account based key (every cloud application or service user/account has one key, not exported); session based key (not exported, one key per session, e.g., HTTP session, per login); and transaction based key (not exported, one key per transaction (e.g., HTTP POST Request, form "submit").

Figure 4:
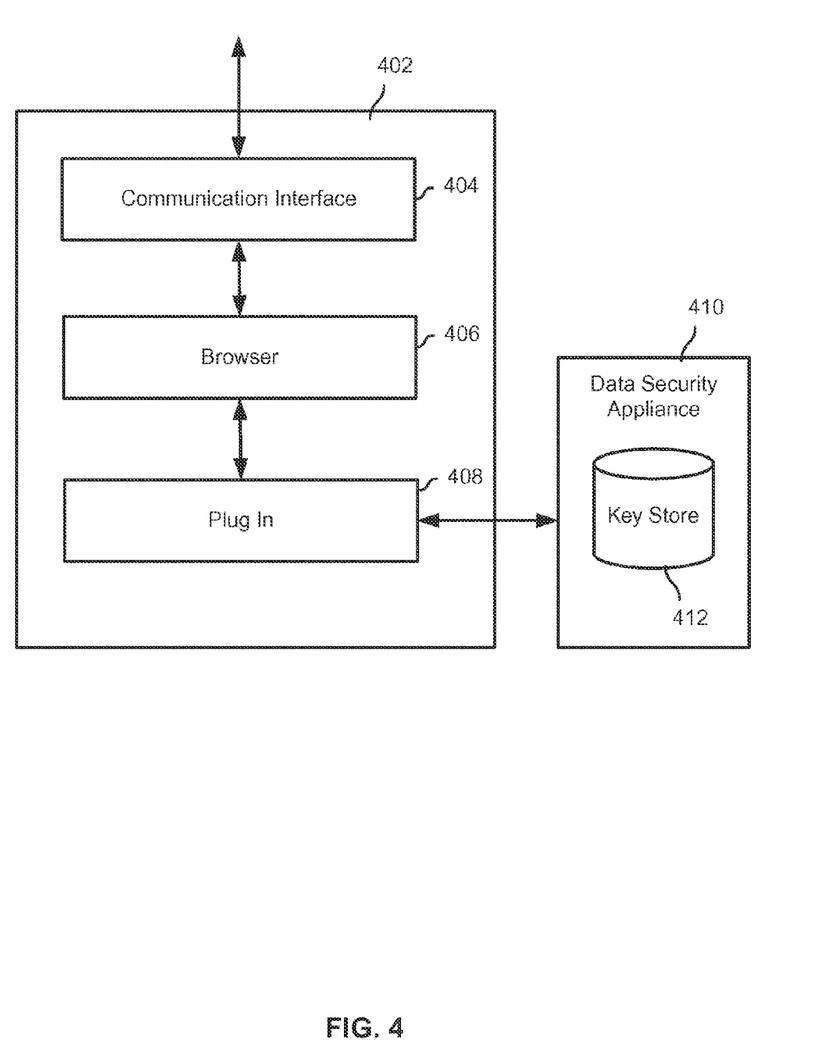
FIG. 4 is a block diagram illustrating an embodiment of a client system to provide data protection in a cloud computing environment.

FIG. 4 is a block diagram illustrating an embodiment of a client system to provide data protection in a cloud computing environment. In the example shown, the client system 402, such as a desktop, laptop, or other portable computer, a smart phone, tablet, or other mobile computing device, etc., includes a communication interface 404 to provide network connectivity. A browser software 406 provides access to web pages and other content retrieved from remote servers via communication interface 404. A browser plug in 408 monitors browser 406 and retrieved pages to determine which contain form fields. Display pages retrieved by browser 406 and which contain form fields are recognized by plug in 408 and displayed in a manner that provides the viewing user with a control to invoke and applied field specific protection to data to be submitted via the form or other display page. In the example shown, a data protection appliance 410 is connected to the client device 402, e.g., via a USB or other wired or wireless port or other connection. In various embodiments, the data protection appliance 410 supports the protection of selected data as disclosed herein, for example by performing one or more of the following: storing a list of URL's associated with cloud applications or services; tracking URL's to which protected data has been submitted; and generating, managing, and storing keys used to protect data. The data protection appliance 410 includes a security key store 412 to store keys used to encrypt selected data prior to its being submitted to a cloud application or service.

Figure 5A:
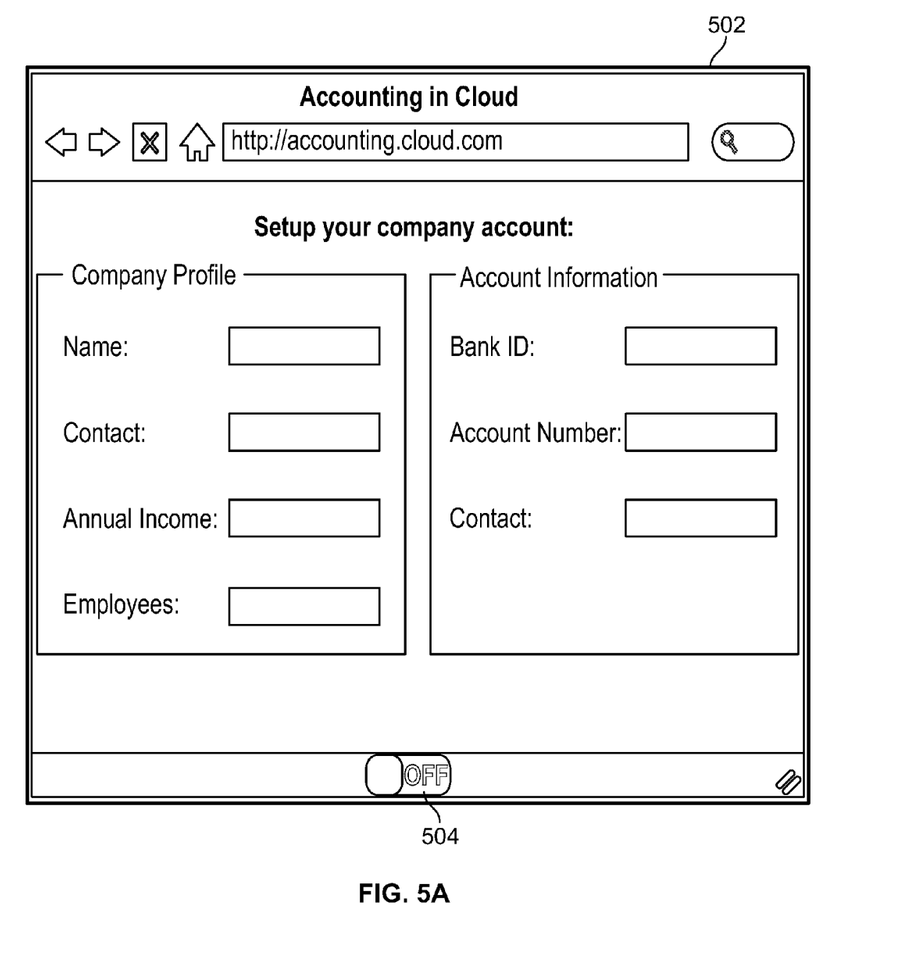
FIG. 5A is a block diagram illustrating an embodiment of a data protection user interface.

FIG. 5A is a block diagram illustrating an embodiment of a data protection user interface. In the example shown, the display page 502 includes a browser controls portion at the top, and a cloud application or service display page portion in the middle, in this example a page to set up an account at a cloud application or service associated with the URL "accounting.cloud.com". Specifically, the display page includes two parts, a "Company Profile" part on the left and an "Account Information" part on the right. A toggle control 504 at the bottom of the page 502 enables to the user to activate or deactivate a selective data protection interface. In the example shown in FIG. 5A, the control 504 is in the "off" state.

Figure 5B:
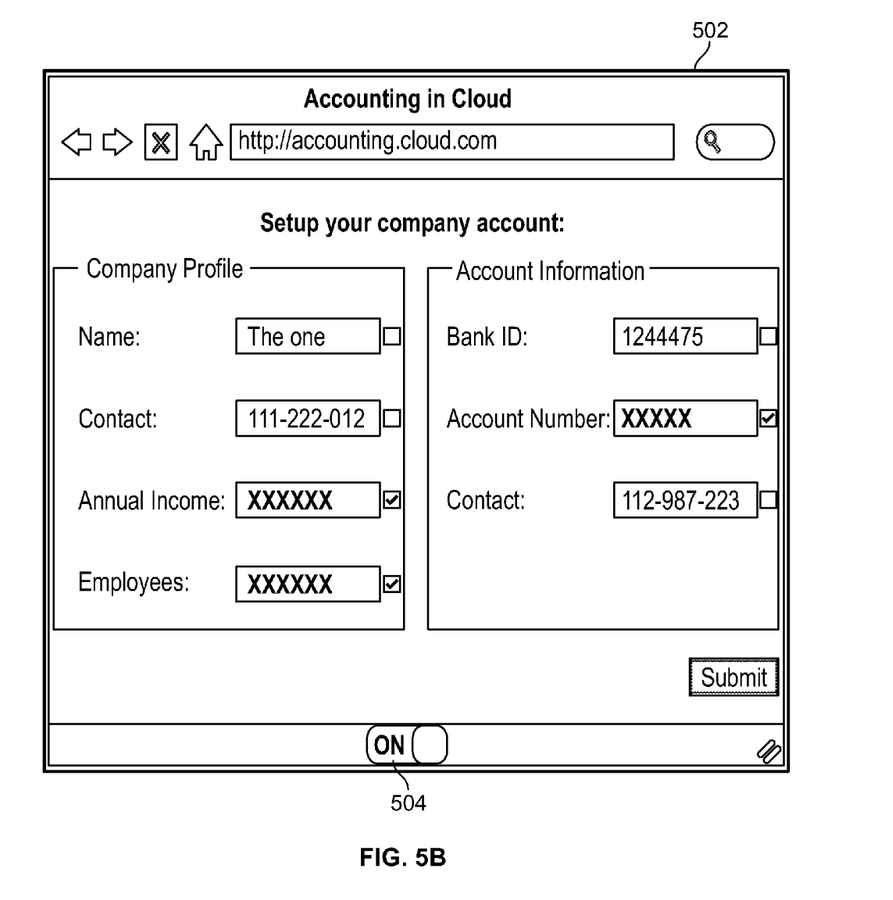
FIG. 5B is a block diagram illustrating an embodiment of a data protection user interface.

FIG. 5B is a block diagram illustrating an embodiment of a data protection user interface. In this example, the control 504 has been toggled to place the data protection interface in an active or "on" state. In response, checkbox controls have been displayed adjacent to each form field. The checkbox controls in the example shown have been used to designate the "annual income", "employees", and "account number" fields to be protected. In response to the selection, the user supplied data in these fields has been obscured and a visual indication provided that the data in the field has been identified to be protected.

Figure 5C:
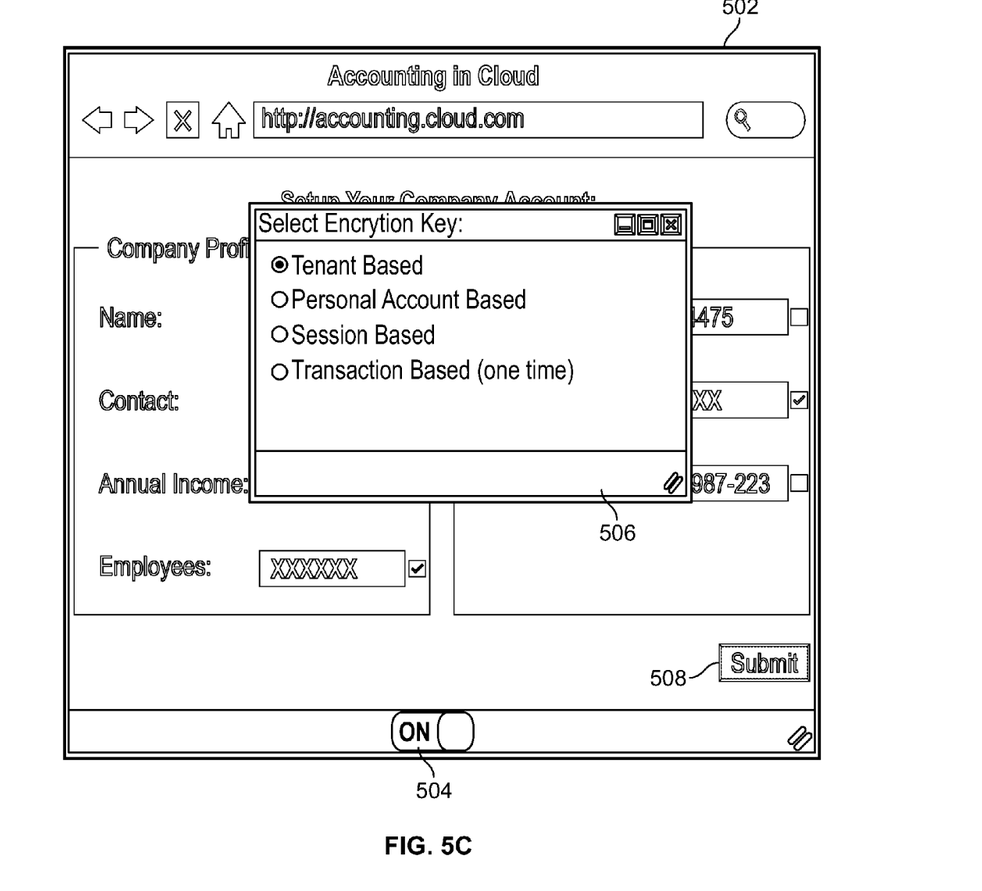
FIG. 5C is a block diagram illustrating an embodiment of a data protection user interface.

FIG. 5C is a block diagram illustrating an embodiment of a data protection user interface. In the example shown, a popup window 506 has been displayed to enable the user to specify a type of encryption key to be used. In this example, the "tenant based" key option has been selected. In various embodiments, selection of the tenant based option would result in the data values entered into fields that have been selected by the user to be protected being encrypted using a tenant based key associated with a cloud application or service tenant (customer) with which the current user is associated being used to encrypt the data identified by the user to be protected. Other users associated with the same tenant (e.g., other users from the same enterprise or other organization) and who have access to the same tenant based key may in some embodiments be able to retrieve and use the tenant based key to access (e.g., view) the data submitted by the user who first submitted it. In some embodiments, the tenant based key must be exported explicitly to such other users and/or the submitting user must specify the other users who are to have access, e.g. individually, by group, by role, etc. In the example shown in FIG. 5C, the display page includes a "submit" button 508 which, when selected, results in the data values entered into fields designated to be protected being encrypted in the manner specified by the user in the pop up interface 506 and submitted in encrypted form, possibly with other data not identified to be protected being sent in unencrypted form, to the cloud application or service with which the display page 502 is associated.

Figure 6:
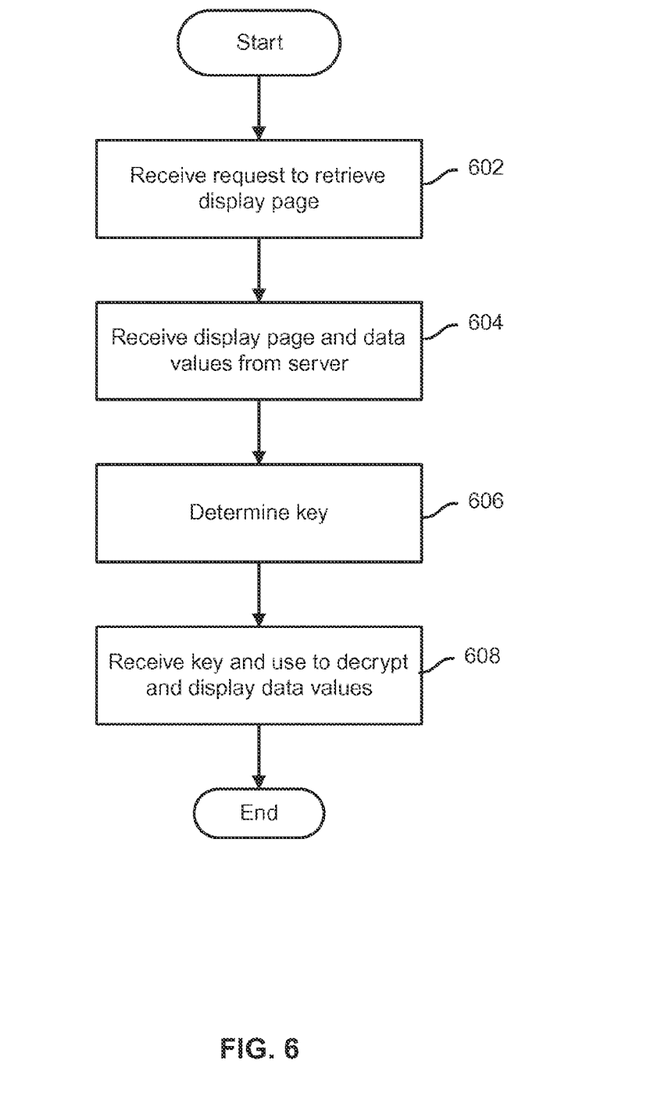
FIG. 6 is a flow chart illustrating an embodiment of a process provide access to protected data in a cloud computing environment.

FIG. 6 is a flow chart illustrating an embodiment of a process provide access to protected data in a cloud computing environment. In the example shown, a request to retrieve a display page is received (602), e.g., a URL is entered into a browser interface. The display page is requested, and the page and associated data values are received (604). If the page is one associated with a cloud application or service to which one or more of the retrieved data values were submitted in encrypted form, the key used to encrypt the data is determined (606). For example, the user may be asked to select the key from a list that identifies each key at least in part by the URL with which it is associated, i.e., the display page or domain to which data encrypted using that key was posted. In some embodiments, the data protection appliance is configured to learn (e.g., remember) the association between a key and the corresponding URL(s) to which data encrypted using that key has been submitted, and if the association is known the correct key is determined automatically based at least in part on the URL of the display page that has been retrieved and is to be displayed. The determined key is received, e.g., from the data protection appliance, and used to decrypt and display data values received in encrypted form (608).

Figure 7A:
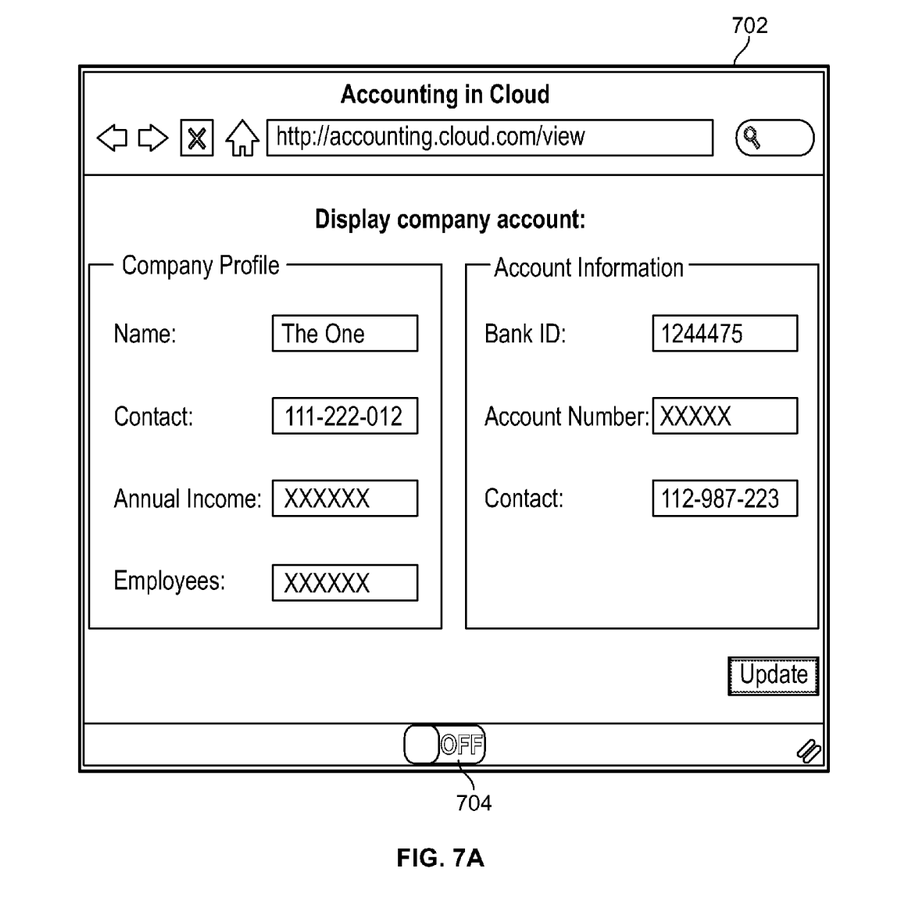
FIG. 7A is a block diagram illustrating an embodiment of a data retrieval user interface.

FIG. 7A is a block diagram illustrating an embodiment of a data retrieval user interface. In the example shown, the data retrieval display page 702 includes the fields of display page 502 of FIGS. 5A-5C, with the data values for fields selected by the submitting user to be protected initial being obscured, in this case replaces by x's, as shown. A control 704 enables the viewing user to access an interface to obtain access to the protected data values.

Figure 7B:
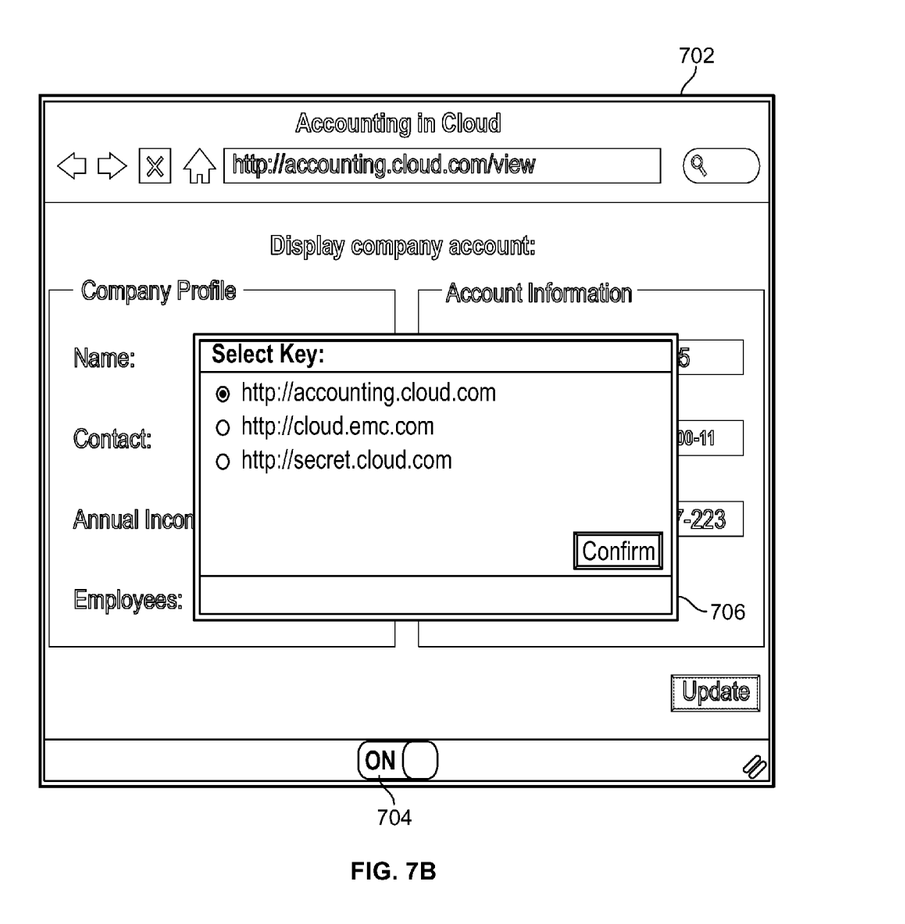
FIG. 7B is a block diagram illustrating an embodiment of a data retrieval user interface.

FIG. 7B is a block diagram illustrating an embodiment of a data retrieval user interface. In this example, the control 704 has been toggled to the "on" state, resulting in a pop up interface 706 being displayed. The interface 706 prompts the user to select (or in this case confirm) the appropriate key to be used to decrypt the encrypted data values received with or otherwise in connection with display page 702.

Figure 7C:
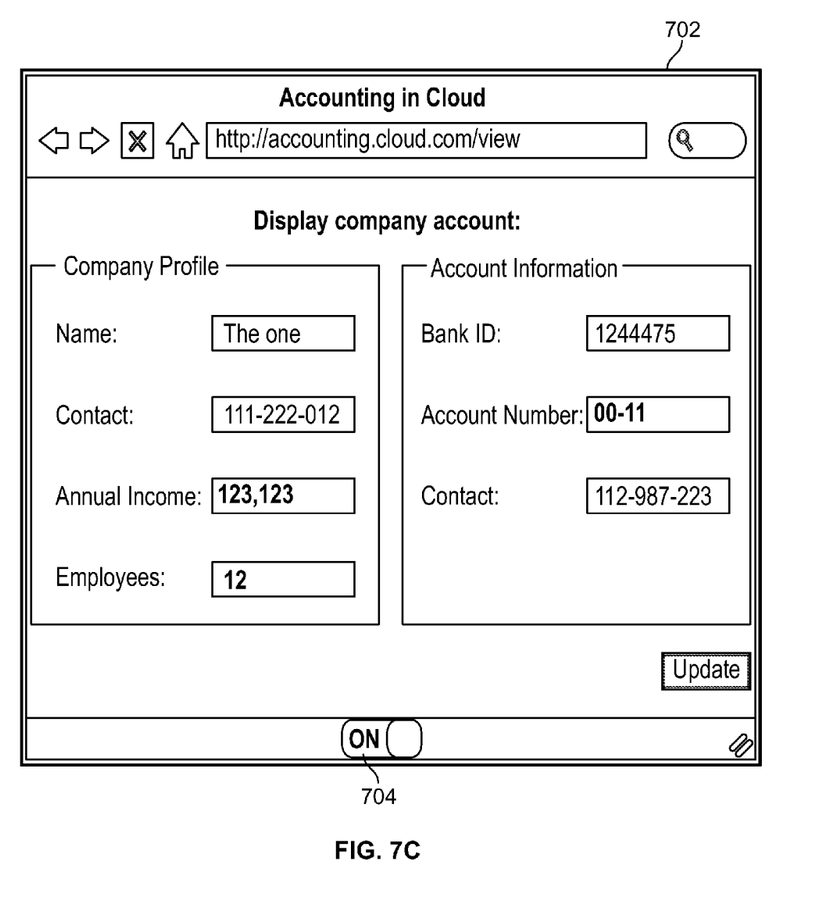
FIG. 7C is a block diagram illustrating an embodiment of a data retrieval user interface.

FIG. 7C is a block diagram illustrating an embodiment of a data retrieval user interface. In this example, the appropriate key has been selected (or confirmed) by the user. The key has been obtained from the data protection appliance and used to decrypt and display data values for the protected data fields. In this example, a visual indication (e.g., background color or other formatting) is provided to identify those fields that contain protected data values.

Techniques disclosed herein may be used in various embodiments to provide a highly granular degree of end user control over which data is protected and the method of encryption and/or other protections to be used to protect the data selected to be protected, resulting in a much more secure cloud computing environment, for example for enterprises and other cloud computing customers.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of protecting data, comprising:
    receiving an indication that a data value to be submitted, using a browser, to a remote node is to be protected, wherein the remote node comprises a cloud-based application or service;
    receiving, via a selective data protection interface, an indication that selective data protection is to be activated;
    in response to receiving the indication that selective data protection is to be activated, providing one or more fields by which the indication that the data value to be submitted is to be protected is input, wherein the one or more fields respectively correspond to one or more data values to be submitted to the remote node;
    receiving an input corresponding to a submission of the data value to the remote node, wherein the data value is included in a set of data values associated with a display page;
    in response to receiving the input corresponding to the submission of the data value to the remote node, prompting a user to select a type of encryption to be used for protection of the data value, wherein the type of encryption is related to a policy of the encryption to be used;
    automatically determining, by a processor, a security key at least in part by selecting a security key that is associated with the remote node to which the data value is to be submitted, wherein a plurality of security keys are stored in a key store, wherein each of at least some of the plurality of security keys in the key store are associated with an identifier of a corresponding remote node, and wherein selecting the security key that is associated with the remote node includes identifying the security key that is associated with an identifier of the remote node from the plurality of security keys in the key store;
    selectively encrypting, by a processor, the data value based at least in part on the security key; and
    providing the encrypted data value to the browser to be submitted to the remote node.

2. The method of claim 1, wherein the encrypted data value is included by the browser in a communication sent to the remote node.

3. The method of claim 2, wherein the communication includes an HTTP GET or POST.

4. The method of claim 2, wherein the communication includes submission of a form.

5. The method of claim 1, further comprising presenting to a user a client interface to enable the user to provide the indication that the data value is to be protected.

6. The method of claim 5, wherein the client interface is provided at least in part by a browser plug in.

7. The method of claim 1, wherein the key store comprises a locally connected data protection appliance and selectively encrypting the data value includes obtaining the security key from the locally connected data protection appliance.

8. The method of claim 7, wherein the locally connected appliance stores at least one association between a security key and an URL or other identifier associated with a remote node.

9. The method of claim 1, the data value is included in a subset of one or more data values each of which has been designated by a user to be protected.

10. The method of claim 9, wherein zero or more data values not included in the subset are submitted to the remote node without first being encrypted.

11. The method of claim 1, wherein the remote node is configured to store the data value in encrypted form.

12. The method of claim 11, wherein the remote node is configured to provide the encrypted data value to a requesting node.

13. The method of claim 1, further comprising receiving a request to retrieve and display a display page with which the data value is associated.

14. The method of claim 1, further comprising retrieving, decrypting, and displaying the data value.

15. The method of claim 14, further comprising obtaining a secret key to decrypt the encrypted data value.

16. The method of claim 15, wherein the secret key is obtained from a locally connected appliance.

17. A system to protect data, comprising:
    a communication interface; and
    a processor coupled to the communication interface and configured to:
        receive an indication that a data value to be submitted to a remote node via the communication interface is to be protected, wherein the remote node comprises a cloud-based application or service;
receive, via a selective data protection interface, an indication that selective data protection is to be activated;
in response to receiving the indication that selective data protection is to be activated, provide one or more fields by which the indication that the data value to be submitted is to be protected is input, wherein the one or more fields respectively correspond to one or more data values to be submitted to the remote node;
receive an input corresponding to a submission of the data value to the remote node, wherein the data value is included in a set of data values associated with a display page;
in response to receiving the input corresponding to the submission of the data value to the remote node, prompt a user to select a type of encryption to be used for protection of the data value, wherein the type of encryption is related to a policy of the encryption to be used;
automatically determine a security key at least in part by selecting a security key that is associated with the remote node to which the data value is to be submitted, wherein a plurality of security keys are stored in a key store, wherein each of at least some of the plurality of security keys in the key store are associated with an identifier of a corresponding remote node, and wherein selecting the security key that is associated with the remote node includes identifying the security key that is associated with an identifier of the remote node from the plurality of security keys in the key store;
selectively encrypting the data value based at least in part on the security key; and
providing the encrypted data value to a browser to be submitted to the remote node; and
a memory coupled to the processor and configured to provide instructions to the processor.

18. The system of claim 17, wherein the processor is further configured to obtain from a locally connected appliance security key to be used to encrypt the data value.

19. A computer program product to protect data, the computer program product being embodied in a tangible and non-transitory computer readable storage medium and comprising computer instructions for:

receiving an indication that a data value to be submitted, using a browser, to a remote node is to be protected, wherein the remote node comprises a cloud-based application or service;
receiving, via a selective data protection interface, an indication that selective data protection is to be activated;
in response to receiving the indication that selective data protection is to be activated, providing one or more fields by which the indication that the data value to be submitted is to be protected is input, wherein the one or more fields respectively correspond to one or more data values to be submitted to the remote node;
receiving an input corresponding to a submission of the data value to the remote node, wherein the data value is included in a set of data values associated with a display page;
in response to receiving the input corresponding to the submission of the data value to the remote node, prompting a user to select a type of encryption to be used for protection of the data value, wherein the type of encryption is related to a policy of the encryption to be used;
automatically determining a security key at least in part by selecting a security key that is associated with the remote node to which the data value is to be submitted, wherein a plurality of security keys are stored in a key store, wherein each of at least some of the plurality of security keys in the key store are associated with an identifier of a corresponding remote node, and wherein selecting the security key that is associated with the remote node includes identifying the security key that is associated with an identifier of the remote node from the plurality of security keys in the key store;
selectively encrypting the data value based at least in part on the security key; and
providing the encrypted data value to the browser to be submitted to the remote node.

20. The method of claim 1, wherein the identifier of the remote node comprises an URL.

21. The method of claim 1, wherein the type of security key is one of the following: a tenant-based security key, an account-based security key, a session-based security key, and a transaction-based security key.

* * * * *